Dec. 26, 1950  H. P. PHILLIPS  2,535,597
EXPANDER FOR PISTON RINGS
Filed Nov. 8, 1948
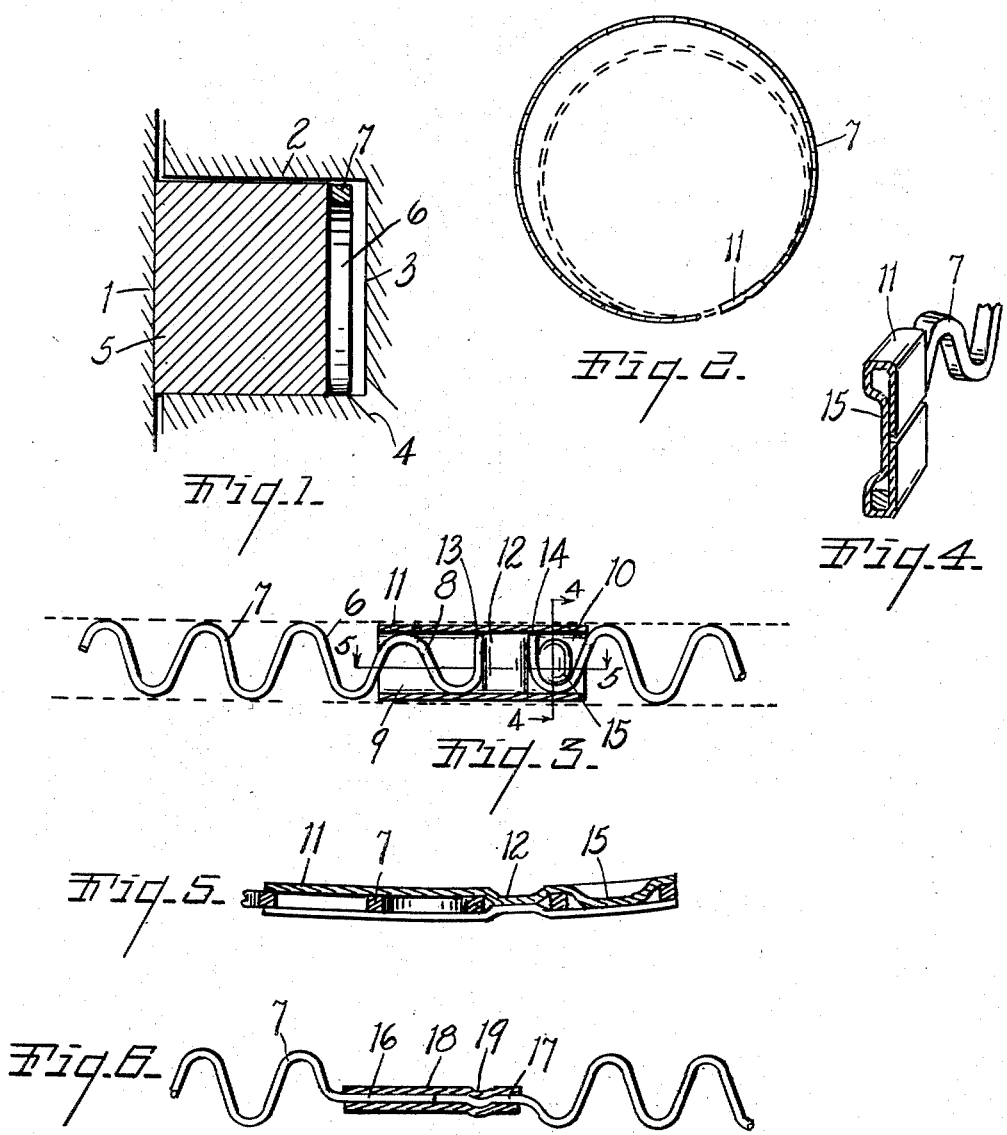
INVENTOR.
Harold P. Phillips
BY
ATTORNEY.

Patented Dec. 26, 1950

2,535,597

UNITED STATES PATENT OFFICE 2,535,597

EXPANDER FOR PISTON RINGS

Harold P. Phillips, Hastings, Mich., assignor to Hastings Manufacturing Company, Hastings, Mich.

Application November 8, 1948, Serial No. 58,832

9 Claims. (Cl. 309—43)

This invention relates to improvements in expanders for piston rings.

The main objects of this invention are:

First, to provide an expander for piston rings which may be formed of a strand of wire corrugated or sinuously bent axially of the expander.

Second, to provide an expander which imparts a substantially uniform radial thrust throughout on the piston ring member or element with which it is associated.

Third, to provide a piston ring expander member having these advantages which may be very economically produced and readily installed in a piston ring groove in operative relation to the piston ring member or element with which it is associated; and one which occupies very little space in a piston ring groove and the efficiency of which does not depend on its being supported on the bottom of a groove.

Objects relating to details and economies of the invention will appear from the description to follow. The invention is defined and pointed out in the claims.

A preferred embodiment of the invention is illustrated in the accompanying drawing in which:

Fig. 1 is an enlarged fragmentary longitudinal section through a cylinder and piston and piston ring with which my expander is associated, the cylinder, piston and ring member being conventionally illustrated.

Fig. 2 is an edge elevational view of the expander of my invention shown in open position by full lines and in closed position by dotted lines.

Fig. 3 is an enlarged fragmentary view partially in section illustrating structural details of my expander, the walls of a piston ring groove being generally indicated by dotted lines to show the association of the expander therewith.

Fig. 4 is an enlarged fragmentary perspective view in transverse section on a line corresponding to line 4—4 of Fig. 3.

Fig. 5 is an enlarged fragmentary view in longitudinal section on a line corresponding to line 5—5 of Fig. 3.

Fig. 6 is a fragmentary view partially in section illustrating a modified form or embodiment of my invention.

In the accompanying drawing 1 represents a cylinder and 2 a piston having a piston ring groove 3 therein provided with drainage openings 4. A piston ring 5 is arranged in the groove with an expander 6 embodying my invention in operative relation thereto. The cylinder, piston and the piston ring of this figure are conventionally illustrated and without regard to size, clearances and tolerances.

The expander of my invention consists of a strand of resilient wire 7 corrugated or sinuously bent axially of the expander. The strand is preferably of flat wire stock or of rectangular section. The end corrugations or bends 8 are of somewhat less depth in order to enable them to be inserted in the sockets 9 and 10 of the coupling member 11. This coupling member is desirably formed of thin sheet metal stock folded upon itself into a tubular form and upset at 12 to provide end thrust abutments for the ends 13 and 14 of the strand. The end 14 is permanently anchored to the coupling by means of the upset or indentation 15 which engages the end 14 holding it within the coupling member. The other end of the expander is removably engaged in the socket to permit the ring to be opened, as shown by full lines in Fig. 2, facilitating its insertion in the ring groove, the end being inserted in the socket or coupling member when the ring is in position in the groove.

When a piston ring element is installed at the outer side of the expander and compressed into a cylinder the expander is placed under compressive stress and acts to resiliently urge the ring element against the cylinder wall or axially outward. The expansion stresses are well distributed throughout the ring.

It should be borne in mind that some piston ring elements are quite flexible and this expander is well adapted for use with such rings although I have shown it in connection with a conventional relatively heavy type of cast iron ring. The expander of my invention is adapted for use with a very wide range of ring elements or ring assemblies such for example as illustrated in my Patent No. 2,148,997, issued February 28, 1939.

It will be understood that the yielding support of the ring elements results from the compression stresses which are placed upon the several corrugations or sinuous bends under the contracting tension or tension such as results from the contracting or expanding of the expander with the result that the expansion thrust is well distributed throughout the whole circumference of the expander.

In the modification of my invention shown in Fig. 6 the expander strand 7 terminates in tang-like end portions 16 and 17 which are engaged in the tubular coupling 18. As in the preferred embodiment one terminal or end of the expander strand is secured in the coupling member as by slacking, as indicated at 19. The other end is telescopingly removable to facilitate assembly.

The expanders of my invention may be very economically produced and while flat wire stock or stock of rectangular section is preferred it may be practically formed of round wire stock.

I have illustrated and described my invention in highly practical embodiments thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. An annular piston ring expander comprising a corrugated strand of spring wire stock with the corrugations disposed axially of the expander, and a tubular coupling member of radially flattened section with which the end corrugations of the strand are engaged, the coupling member having an intermediate upset therein providing abutments for the ends of the strand, the coupling being further upset to retainingly engage one end of the strand, the other end being removably engaged in the other end of the coupling member.

2. An annular piston ring expander comprising a corrugated strand of spring wire stock with the corrugations disposed axially of the expander, and a tubular coupling member with which the end corrugations of the strand are engaged, the coupling being upset to retainingly engage one end of the strand, the other end being removably engaged in the other end of the coupling member.

3. An annular piston ring expander comprising a sinuously bent strand of spring wire stock having the bends thereof disposed axially of the expander, and a coupling member of flattened cross section in which the end corrugations are telescopingly disposed, one end being retainingly secured to the coupling member and the other removably engaged therewith to facilitate assembly.

4. An annular piston ring expander comprising a sinuously bent strand of spring wire stock having the bends thereof disposed axially of the expander, and a coupling member of flattened cross section in which the end corrugations are telescopingly disposed.

5. A split annular expander for piston rings comprising, a zigzag strand of springable material, the bends of the strand being disposed axially, and a thrust sustaining coupling for the ends of the strand, the stress to which the corrugations are subjected when the element is peripherally compressed as when installed in operative relation in a piston ring element within a piston ring groove acting to maintain at least one end of the element in engagement with the coupling and the corrugations of the element under spring stress acting to expand the member when it is under peripheral compression.

6. An expander for piston ring elements comprising, a laterally corrugated strand of spring wire having its ends connected in thrust sustaining relation when the expander is circumferentially compressed in operative relation to a piston ring element within a piston ring groove, and a coupling member for retaining said spring wire ends in said thrust sustaining relation, one of the ends of the spring wire being fixedly secured to one end of the coupling member and the other end of the spring wire being telescopingly slidable within the opposite end of the coupling member to facilitate ready closing and opening of the expander.

7. An expander for piston rings comprising, a laterally corrugated strand of springable stock having its ends connected in thrust sustaining relation, and a coupling member for retaining said spring wire ends in said thrust sustaining relation, one of the ends of the spring wire being fixedly secured to one end of the coupling member and the other end of the spring wire being telescopingly slidable within the opposite end of the coupling member to facilitate ready closing and opening of the expander.

8. An expander for piston ring elements comprising, a zigzag bent strand of spring material, and connecting means for the opposite ends of the strand sustaining end thrust thereon when the expander is installed under compression within a piston ring groove in operative radial thrust relation to a piston ring element, one of the ends of the strand being fixedly secured to said connecting means, the other end of the strand being telescopingly slidably associated with the connecting means to permit ready closing and opening of the expander.

9. An annular springably contractable and expansible piston ring expander adapted for assembly in a ring groove of a piston within a cylinder wall engaging element comprising, a sinuously bent strand of spring wire stock having the bends thereof disposed axially of the expander, there being a plurality of elongated terminal bends at each end of the strand adapted for retaining thrust sustaining engagement.

HAROLD P. PHILLIPS.

REFERENCES CITED

The following references are of record in the file of this patent:

UNITED STATES PATENTS

| Number | Name | Date |
| --- | --- | --- |
| 1,767,711 | Solenberger | June 24, 1930 |
| 2,229,578 | Malpas | Jan. 21, 1941 |
| 2,293,450 | Wilkening | Aug. 18, 1942 |
| 2,397,900 | Zetnick | Apr. 2, 1946 |

FOREIGN PATENTS

| Number | Country | Date |
| --- | --- | --- |
| 5,788 | Great Britain | of 1898 |
| 809 | Great Britain | of 1899 |
| 566,488 | Great Britain | of 1945 |